Patented Jan. 6, 1931

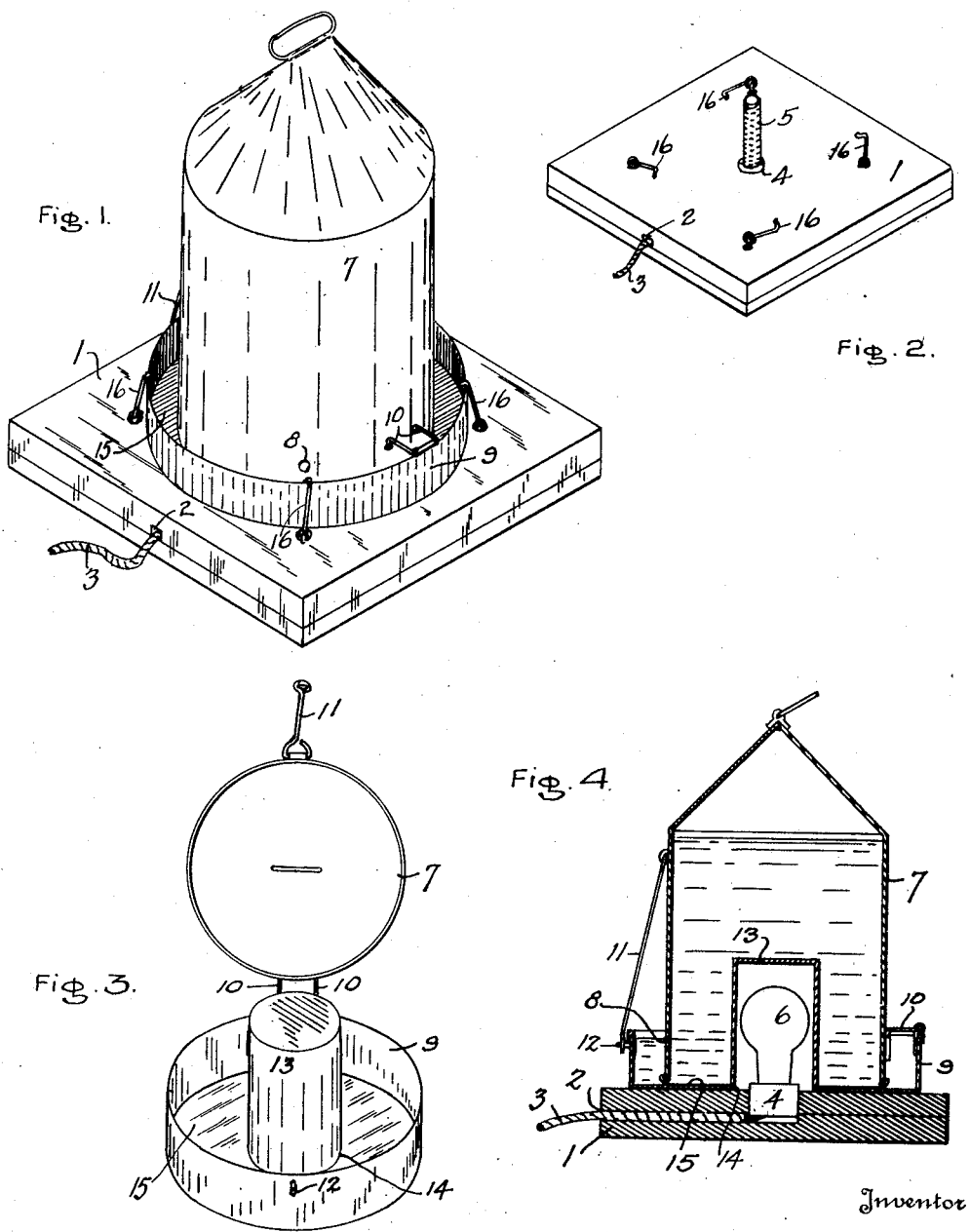

1,787,703

UNITED STATES PATENT OFFICE

HENRY F. RAU, OF TACOMA, WASHINGTON

POULTRY-WATER HEATER

Application filed March 9, 1929. Serial No. 345,653.

My invention relates to chicken fountains adapted to provide the chicks or grown poultry with drinking water, and has for its object to provide means whereby the said drinking water may be kept at a healthful warm temperature in winter weather, thereby preventing the development of certain diseases among the chickens which are due to the drinking water being too cold.

Further objects of my invention are to provide such a heating means which shall be substantially surrounded with water and therefore will not waste heat; which is protected from damage by the chickens; which is readily transported to any desired position; which is easily cleaned; which may be completely demounted for shipping and storage purposes or for repair or renewal of the heating element, or other parts; and which is cheap to make, simple to operate, and effectively warms the water to the desired temperature.

I attain these and other objects by the devices and arrangements illustrated in the accompanying drawings, in which—

Fig. 1 is a perspective view of the complete device; Fig. 2 is a similar view of the base, showing the heating element thereon; Fig. 3 is a similar view of the water-fountain, showing the reservoir tipped back to reveal the heating chamber formed in the trough; and Fig. 4 is a vertical section of the device in use.

Similar numerals of reference refer to similar parts throughout the several views.

Referring to the drawings, it will be seen that my improved water-fountain heater comprises a base carrying a heating element, and a water-fountain having a heating chamber indented therein and adapted to fit over and enclose the heating element carried by the base.

The base 1 is preferably formed of two blocks of wood, suitably secured together to form a single structure. One, or both, of said blocks may be provided with a groove 2, on their contiguous sides, extending inward from the outer edge to the center and adapted to receive the energizing electric cord 3 (suitably connected to a source of electric energy).

A suitable socket 4 is secured in the center of the upper side of the base 1 and is provided with suitable contacts therein, connected to the wires of the cord 3, and adapted to receive any suitable heating element, such as the resistance coil 5 or the electric lamp 6. Such heating element therefore extends upward from the center of the base 1.

The water-fountain comprises the usual reservoir chamber 7, having an open bottom and provided with an orifice 8 at the level at which it is desired to maintain the water in the drinking trough. The trough comprises a shallow dish, preferably with vertical sides 9 whose upper edge is slightly above the level of the orifice 8 of the reservoir when the reservoir is in operative position. This reservoir 7 is hingedly secured to the sides 9 of the trough by means of the two arms 10, secured to the reservoir and revolubly secured to the upper edge of the side 9. The reservoir 7 is provided with a hinged link 11 secured thereto on the side opposite to the said hinge and adapted to hook over a pin 12 on the outer side of the wall 9 of the trough, thereby securing said fountain in operative position, but permitting it to be released therefrom and tipped back on its hinge arms 10 for cleaning and filling with water. The trough is also provided with a heating chamber 13 at its center. This heating chamber 13 comprises an inverted metal receptacle, secured over the hole 14 in the center of the bottom plate 15 of the trough. The chamber thus formed is therefore open at the bottom and is adapted to be set over the heating element 5 or 6, on the base 1, and to enclose the said element therein. The chamber 13 and its connection to the plate 15 is made water-tight in any preferred manner.

The base 1 may also be provided with hooks 16, or other suitable means, whereby it may be releasably secured to the fountain, said hooks 16 being adapted to engage over the upper edge of the side 9 of the trough.

Thus it will be seen that my improved device provides an electrically heated chamber completely immersed in the water in the fountain, whereby the water in the fountain is maintained at a suitable temperature, even in cold weather, thereby saving the lives of many chicks and increasing the health of all. It is also evident that substantially all of the heat produced by the heating element is transferred directly to the surrounding water in the fountain.

Having, therefore, described my invention, what I claim is:—

A water-fountain heater for chicks, comprising an insulating supporting base; an electrically energized heating element mounted thereon and extending upward therefrom and forming a separate unit therewith; a rimmed trough having an open-bottomed inverted chamber extending upward from its center and adapted to enclose said heating element when said trough rests on said base; an inverted open-bottomed water-reservoir surrounding said heating chamber and supported by said trough and adapted to feed water to said trough and to maintain it at a constant level therein and forming a separate unit with said trough; and releasable means joining said units together.

HENRY F. RAU.